US012808137B2

(12) United States Patent
Radut

(10) Patent No.: US 12,808,137 B2
(45) Date of Patent: Nov. 24, 2026

(54) PET LITTER PICKUP DEVICE

(71) Applicant: Iulian Radut, London (GB)

(72) Inventor: Iulian Radut, London (GB)

( * ) Notice: Subject to any disclaimer, the term of this patent is extended or adjusted under 35 U.S.C. 154(b) by 890 days.

(21) Appl. No.: 18/125,671

(22) Filed: Mar. 23, 2023

(65) Prior Publication Data

US 2023/0304240 A1 Sep. 28, 2023

(30) Foreign Application Priority Data

Mar. 25, 2022 (GB) ...................................... 2204292

(51) Int. Cl.
*E01H 1/12* (2006.01)
*A01K 27/00* (2006.01)

(52) U.S. Cl.
CPC .......... *E01H 1/1206* (2013.01); *A01K 27/004* (2013.01); *E01H 2001/1226* (2013.01); *E01H 2001/1266* (2013.01); *E01H 2001/1273* (2013.01); *E01H 2001/128* (2013.01)

(58) Field of Classification Search
CPC .......... E01H 1/1206; E01H 2001/1273; E01H 2001/128; E01H 2001/1286; A01K 27/004
See application file for complete search history.

(56) References Cited

U.S. PATENT DOCUMENTS 7,523,972 B1 * 4/2009 Wawrzynowski .... E01H 1/1206 294/1.3
7,992,907 B1 * 8/2011 DeJesus ................ E01H 1/1206 294/1.4
9,469,951 B1 * 10/2016 Qi ......................... E01H 1/1206
10,772,300 B1 9/2020 Hicks et al.
2008/0042456 A1 2/2008 Patel
2011/0197825 A1 * 8/2011 Jan ........................ E01H 1/1206 119/795

(Continued)

FOREIGN PATENT DOCUMENTS

CN 205421136 U 8/2016
CN 209873672 U 12/2019

(Continued)

OTHER PUBLICATIONS

Extended European Search Report (EESR) prepared by EPO in App. No. EP23164061, dated Aug. 9, 2023 (8 pages).

*Primary Examiner* — Thomas E Lazo
(74) *Attorney, Agent, or Firm* — Koenig IP Works, PLLC; Katherine Koenig

(57) ABSTRACT

A telescopic pet litter pickup device comprises a hand grip at a first proximate end, telescopic members and a picker at a second end, the picker having three or more arms, the hand grip comprising a picking mechanism and the telescopic members are arranged to extend from a first retracted transport length to a second usage length and/or a third usage length longer than the second usage length. The picking mechanism is arranged to control movement of the arms. The picking mechanism is activated by a trigger and is designed to function in any of the first retracted transport length, the second usage length, and/or the third usage length. The arms define an internal volume in a closed position adapted for receiving a pet faeces. The arms include catches adapted to catch and hold a top elastic litter bag within the internal volume in the closed and open position.

15 Claims, 13 Drawing Sheets

(56) References Cited

U.S. PATENT DOCUMENTS

| | | | | |
|---|---|---|---|---|
| 2012/0292933 | A1 * | 11/2012 | Krupp | E01H 1/1206 294/1.4 |
| 2015/0137541 | A1 * | 5/2015 | Hervas Pedraza | E01H 1/1206 294/1.4 |
| 2015/0230811 | A1 * | 8/2015 | Kovarik | A01K 77/00 606/174 |
| 2020/0157753 | A1 * | 5/2020 | Patterson | H05B 3/0014 |

FOREIGN PATENT DOCUMENTS

| | | | | |
|---|---|---|---|---|
| DE | 10042964 | A1 * | 3/2002 | A01K 27/006 |
| DE | 102020108227 | A1 | 2/2021 | |
| GB | 2010730 | A | 7/1979 | |
| WO | 2020058274 | A2 | 3/2020 | |

* cited by examiner

PET LITTER PICKUP DEVICE

CROSS-REFERENCE TO RELATED APPLICATIONS

This application is related to and claims priority to United Kingdom App. No. GB 2204292.3, filed Mar. 25, 2022, entitled A PET LITTER PICKUP DEVICE, the entirety of which is incorporated herein by reference.

GOVERNMENT RIGHTS STATEMENT

N/A.

FIELD

The present invention generally relates to a pet litter pickup device, in particular a device for picking up faeces, more particularly but not exclusively dog faeces.

BACKGROUND

Many people in many societies enjoy keeping, raising, and caring for pet animals, such as dogs. However, it has become necessary to clean up after their pets, for example, removing and disposing elsewhere of the animals' faeces, which can be a problematic and unpleasant chore.

Some devices have been developed to make such tasks easier, but they have shortcomings. The present invention arose in order to overcome problems suffered by existing devices.

SUMMARY

According to a first aspect of the present invention there is provided a telescopic pet litter pickup device, comprising an handgrip at a first proximate end, and a picker at the second distal end, the picker having three or more arms, the handgrip comprising a picking mechanism and the telescopic part is arranged to extend from a first retracted transport length to a second or a third longer usage length and the picking mechanism arranged to control movement of the arms from a first open position to a second closed position, the arms defining an internal volume in the second position adapted for receiving a pet faeces and the arms including catches adapted to catch and hold a litter bag with an elastic top that rests against those catches, the bag will be placed within the internal volume in the first and second position. This device is designed to function in any position whether it is fully extended, partially extended or fully retracted.

In some embodiments the device has three arms or four arms, such that the arms may advantageously provide a reliable shape to describe a larger more regular volume.

In some embodiments the catches comprise reversed hooks, for example such that the hooks return from the distal end of the arms so the elastic top of the litter bag will rest against those hooks. In such embodiments the catches may be envisaged to be located to the distal side of the arms from the internal volume, such that the bag is passed out of the internal volume and caught, defining a caught open mouth to the bag.

In some embodiments the device comprises a locking collar to lock the length extension of the members. In other embodiments it may be envisaged that the members may comprise a bias, and/or a spring means of locking the length of the members.

In some embodiments the telescopic members are made out of metal tubes with a spring loaded self locking mechanism when extended and press to release when retracted.

In some embodiments the handgrip comprises a trigger for the mechanism, so as to provide an easy way to operate and control the picker, which may cooperate well with a standard dog lead arrangement.

In some embodiments the mechanism comprises a pulley that is slightly spring loaded, for example where in a ball chain, a cord or a wire may be kept in light tension and also wrapped around the pulley at all the times.

In some embodiments the device comprises a bag holder, for example so as to store and transport one or more bags for usage with the picker.

In some embodiments the device comprises a light source, for example a directed light source such as a torch, which may be envisaged to be directed at the picker or at the second member or third member in use. The light source may be integrated or displaceable.

According to a second aspect of the present invention there is provided a dog leash housing that will connect with the litter pickup device and together will comprise a whole multifunctional apparatus.

According to a third aspect of the present invention there is provided a handle for such apparatus, comprising a retractable lead.

In some embodiments the handle comprises a lanyard attachment point.

In some embodiments the connection mechanism comprises a dock on the handle. In other embodiments the connection mechanism comprises a ferromagnetic, hook and loop such as Velcro® or a clip mechanism.

In some embodiments each grabbing arms at the end of the device will be spring loaded individually.

In some embodiments the grabbing arms at the end of the device will be spring loaded in the pairs of two across of each other with springs attached by the base of each arms, in this particularly case an elastic also can be used instead of a spring.

In some embodiments the picker will comprise a belt clip so it can be carried separately out of the dog leash housing.

In one embodiment, a pet litter pickup device comprises: a first proximate end and a hand grip at the first proximate end; a second distal end and a picker at a second distal end, the picker having three or more arms; and telescopic members, the telescopic members being arranged to extend from a first retracted transport length to a second usage length and/or a third usage length longer than the second usage length, the hand grip comprising a picking mechanism, wherein: the picking mechanism is arranged to control movement of the three or more arms; the picking mechanism is activated by a trigger; and the picking mechanism is designed to function by being arranged to control movement of the three or more arms from a first open position to a second closed position in any of the first retracted transport length, the second usage length, and/or the third usage length of the telescopic members, wherein: the picking mechanism comprises a spring loaded pulley and a ball chain that is wrapped around the spring loaded pulley to keep the ball chain under tension no matter the telescoped position; and the trigger is configured to pull the ball chain when pulled on to open the three or more arms to the first open position, the trigger being configured to only engage with the ball chain when pulled on, and to allow the chain to pass freely through when the trigger is not pulled, the three or more arms defining an internal volume in the second closed position configured to receiving a pet faeces, and the three or more arms including catches configured to catch and hold a top elastic litter bag within the internal volume in the second closed position and the first open position.

In one aspect of the embodiment, the three or more arms comprises four arms.

In one aspect of the embodiment, the catches comprise reversed hooks.

In one aspect of the embodiment, the catches are located toward a distal side of the three or more arms from the internal volume.

In one aspect of the embodiment, the pet litter pickup device further comprises a member locking collar or a member locking mechanism configured to lock a length extension of the telescopic members at the first retracted transport length, the second usage length, and/or the third usage length. In one aspect of the embodiment, the member locking collar or the member locking mechanism comprises the member locking mechanism configured to lock the length extension of the telescopic members, the member locking mechanism being a spring-loaded pin mechanism configured on the telescopic members such that a centre region of the telescopic members is unoccupied by the member locking mechanism. In one aspect of the embodiment, the member locking mechanism comprises: a flat spring lock element, the flat spring lock element comprising: a flat spring plate; and a spring-loaded pin provided towards a pin end of the flat spring plate, wherein: the flat spring plate is fixed towards a fixing end, opposite to the pin end, to a first one of the telescopic members such that a centre region within the telescopic members is unoccupied by the flat spring lock element; and the member locking mechanism further comprises: an orifice, the orifice being provided on a second one of the telescopic members, the orifice being configured to receive the spring-loaded pin.

In one aspect of the embodiment, the hand grip comprises the trigger for the picking mechanism.

In one aspect of the embodiment, the pet litter pickup device further comprises a light source.

In one aspect of the embodiment, the pet litter pickup device further comprises a bag holder.

In one aspect of the embodiment, the catches are configured to catch and hold the elastic top of the top elastic litter bag when the elastic top rests against the catches.

In one aspect of the embodiment, an apparatus comprising the pet litter pickup device further comprises a handle comprising a lead, the apparatus further comprising a connection mechanism to connect the pet litter pickup device to the handle.

In one aspect of the embodiment, the handle comprises a retractable lead.

In one aspect of the embodiment, the handle comprises a lanyard attachment point.

In one aspect of the embodiment, the connection mechanism comprises a dock on the handle.

BRIEF DESCRIPTION OF THE DRAWINGS

A more complete understanding of embodiments described herein, and the attendant advantages and features thereof, will be more readily understood by reference to the following detailed description when considered in conjunction with the accompanying drawings wherein.

DETAILED DESCRIPTION

Figure 1:
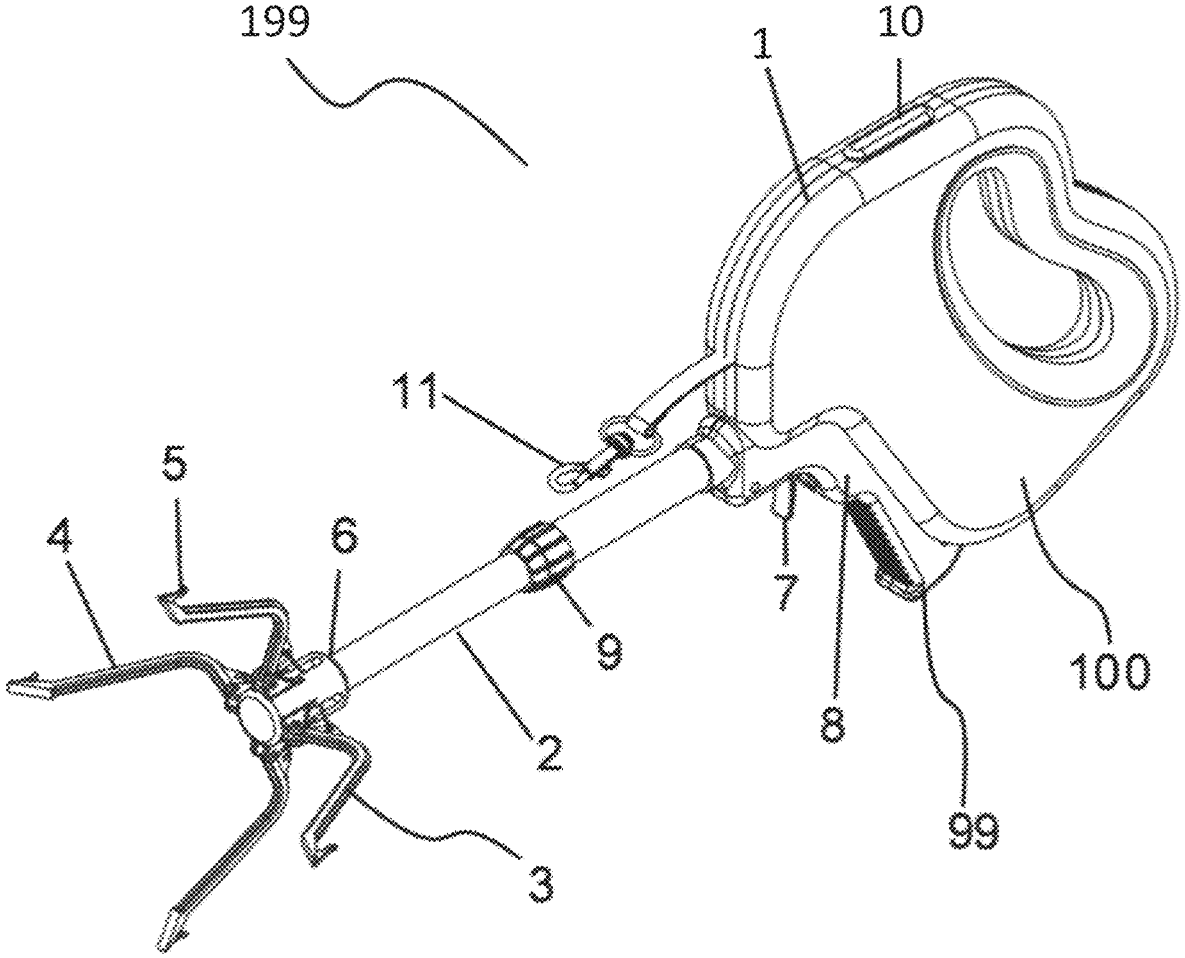
FIG. 1 shows an isometric view of an embodiment of the device according to the first aspect of the present invention with a picker in the first position and elongate member in the second position, incorporated in an apparatus according to the second aspect of the present invention.
Figure 2:
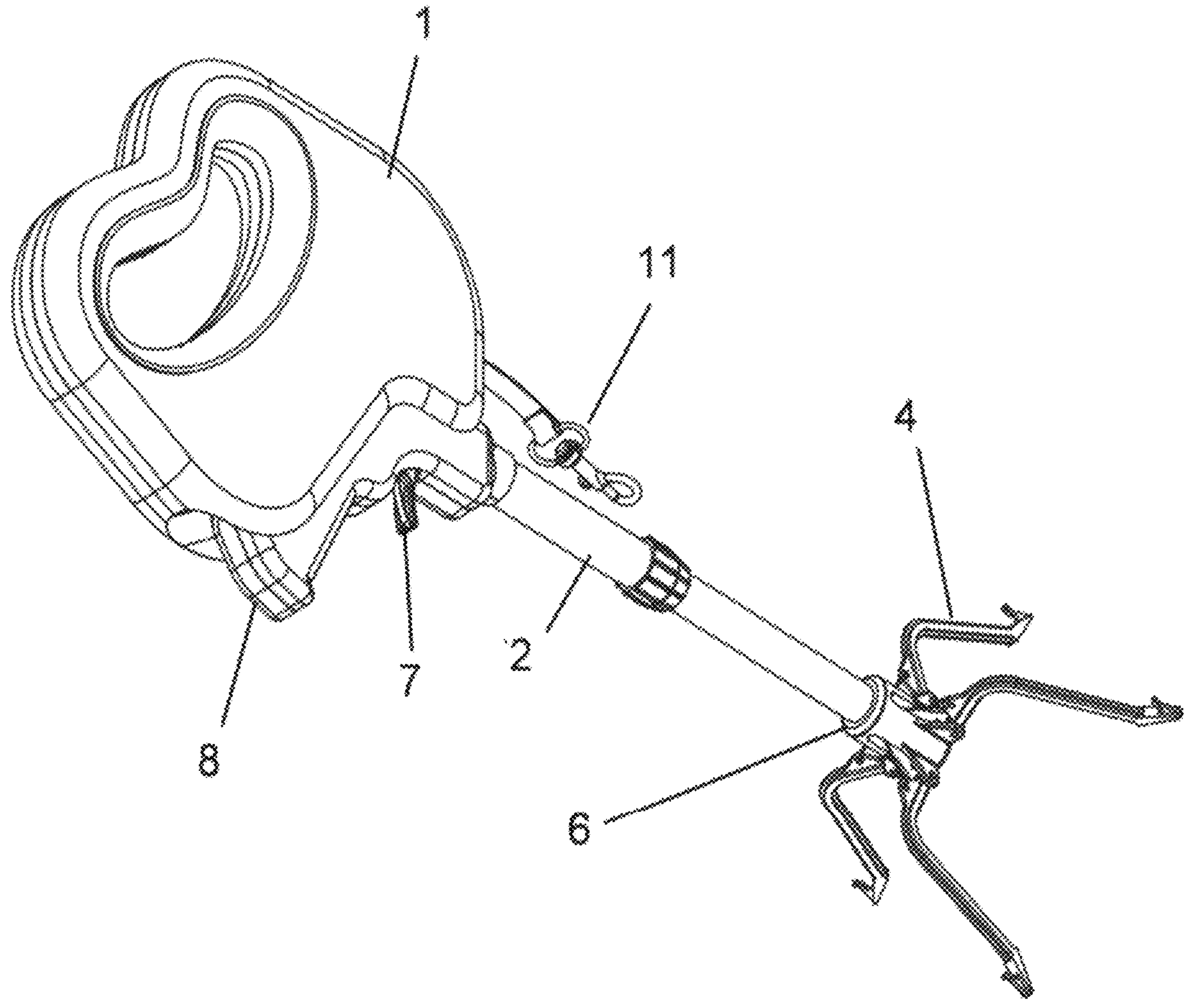
FIG. 2 shows a reverse isometric view of the apparatus as shown in FIG. 1.
Figure 3A:
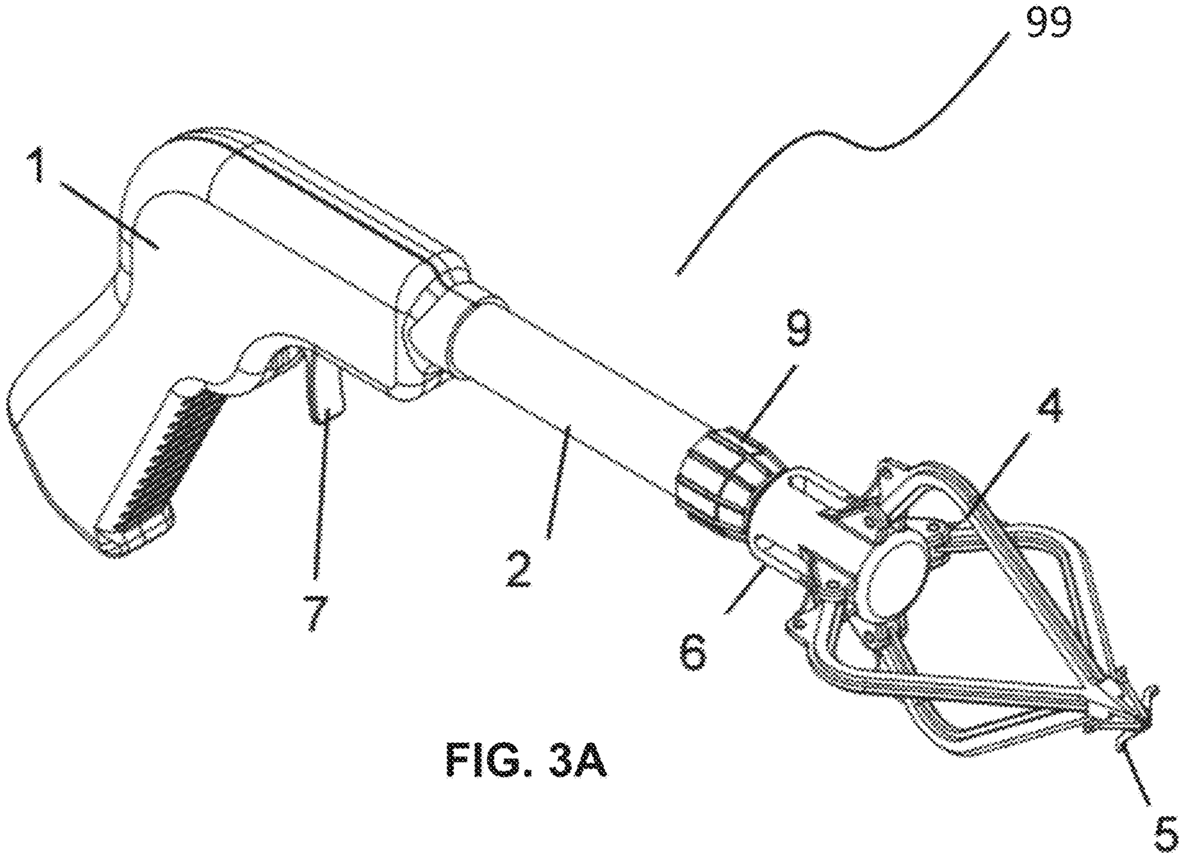
FIGS. 3A and 3B show isometric views of the embodiment of the device shown in FIG. 1, with the picker in the second position and the elongate member in the first and second position respectively.
Figure 3B:
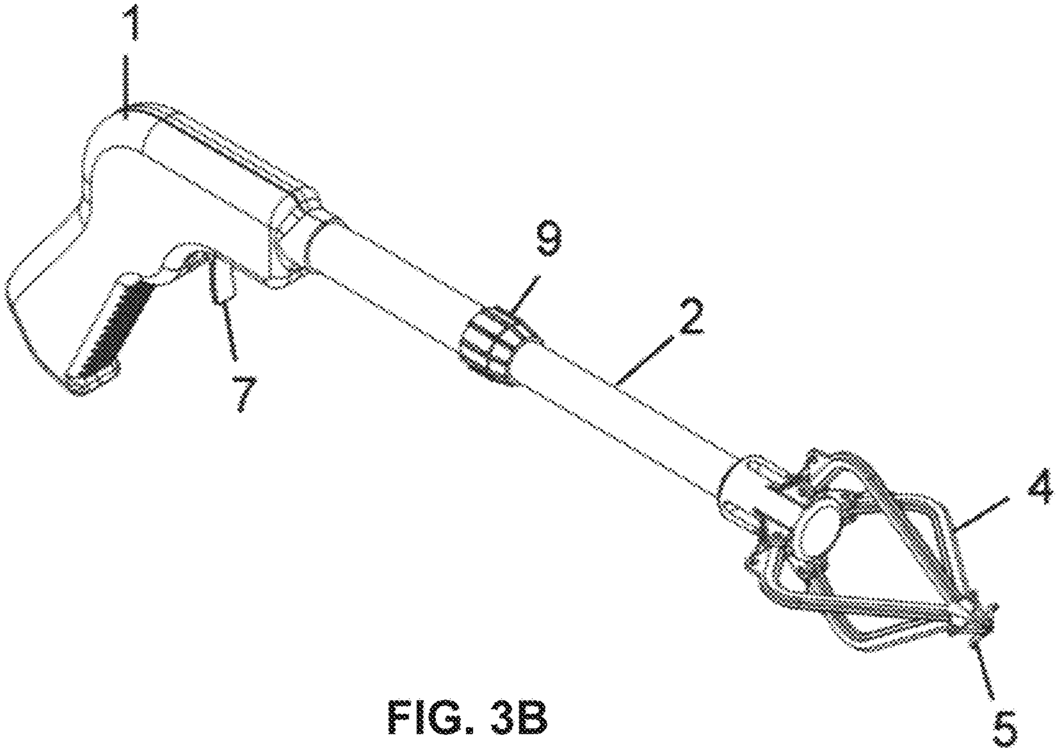
Figure 4A:
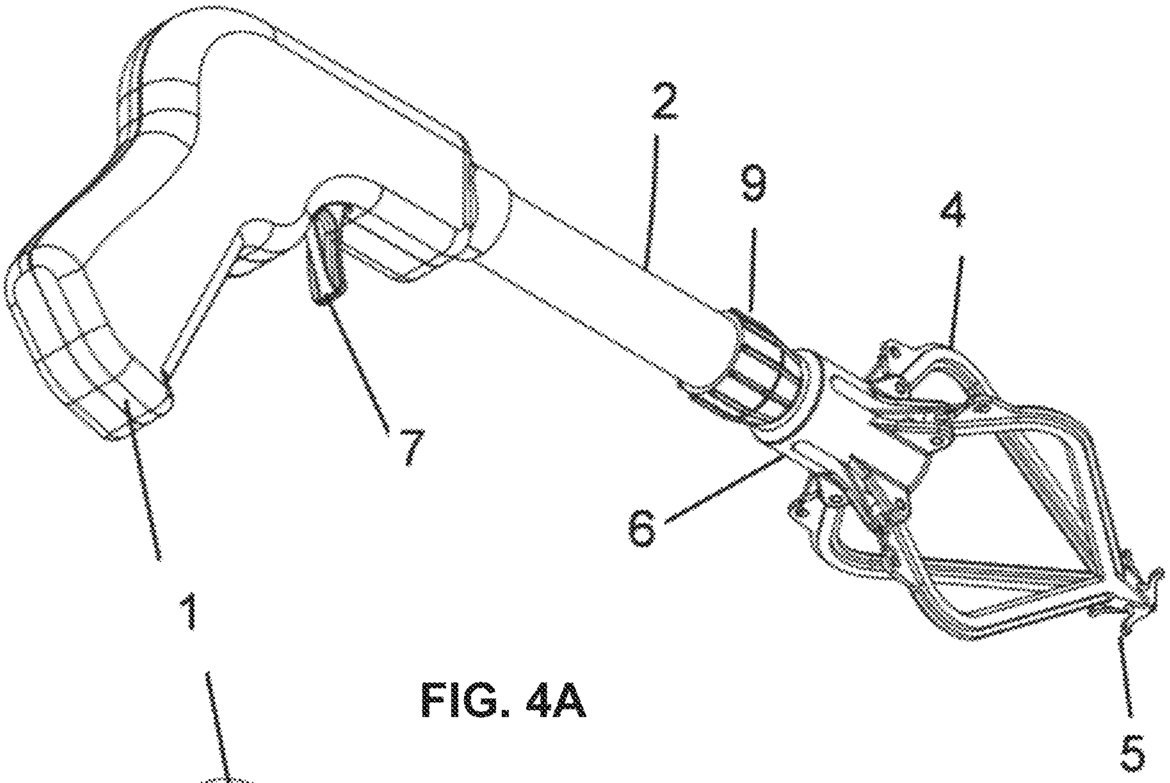
FIGS. 4A and 4B show reverse isometric views of the embodiment of the device shown in FIG. 1, with the picker in the second position and the elongate member in the first and second position respectively.
Figure 4B:
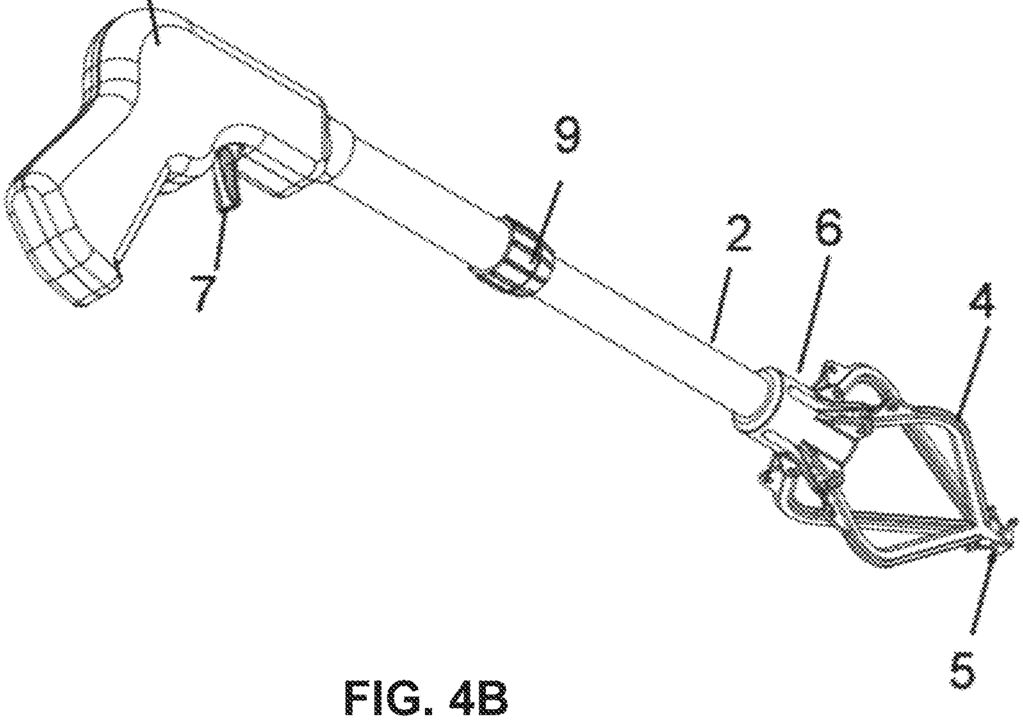
Figure 5:
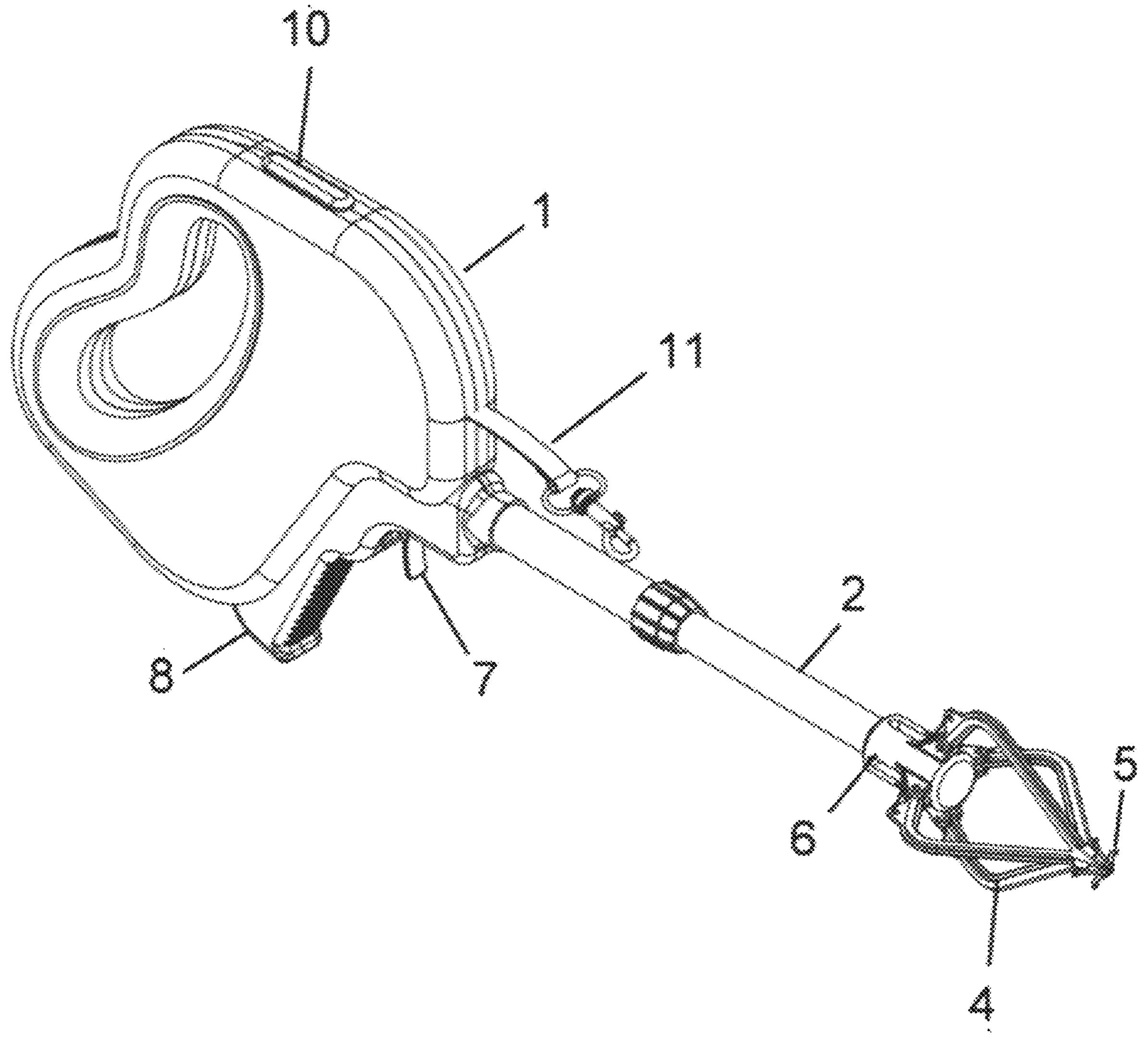
FIG. 5 shows an isometric view of the apparatus shown in FIG. 1, with the picker in the second position and the elongate member in the second position.
Figure 6:
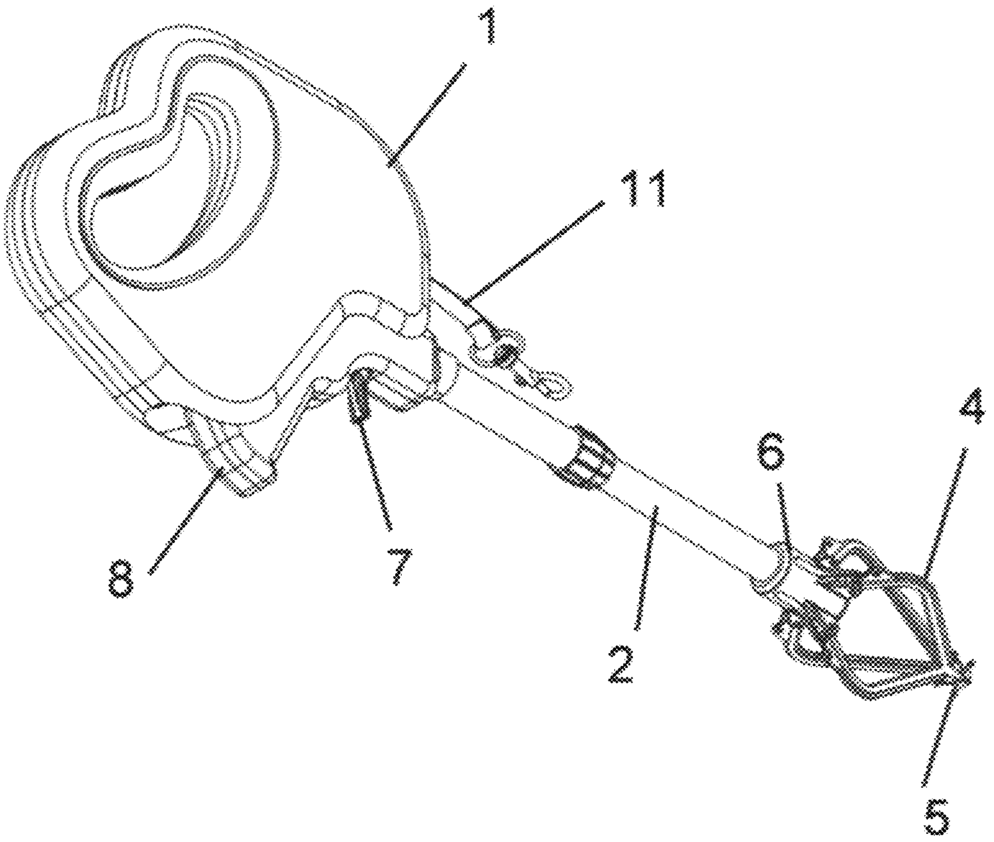
FIG. 6 shows a reverse isometric view of the apparatus shown in FIG. 1, with the picker in the second position and the elongate member in the second position.
Figure 7:
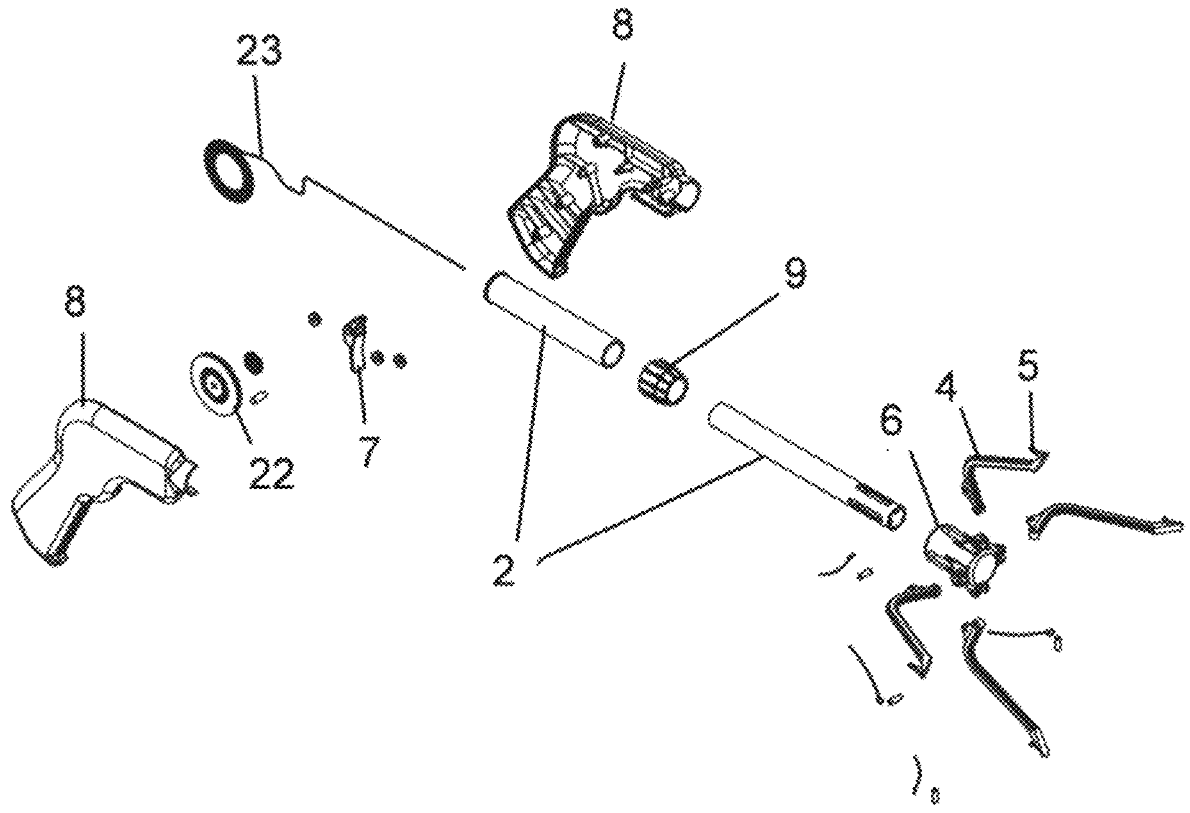
FIG. 7 shows an exploded isometric view of the embodiment of the device shown in FIG.
Figure 8:
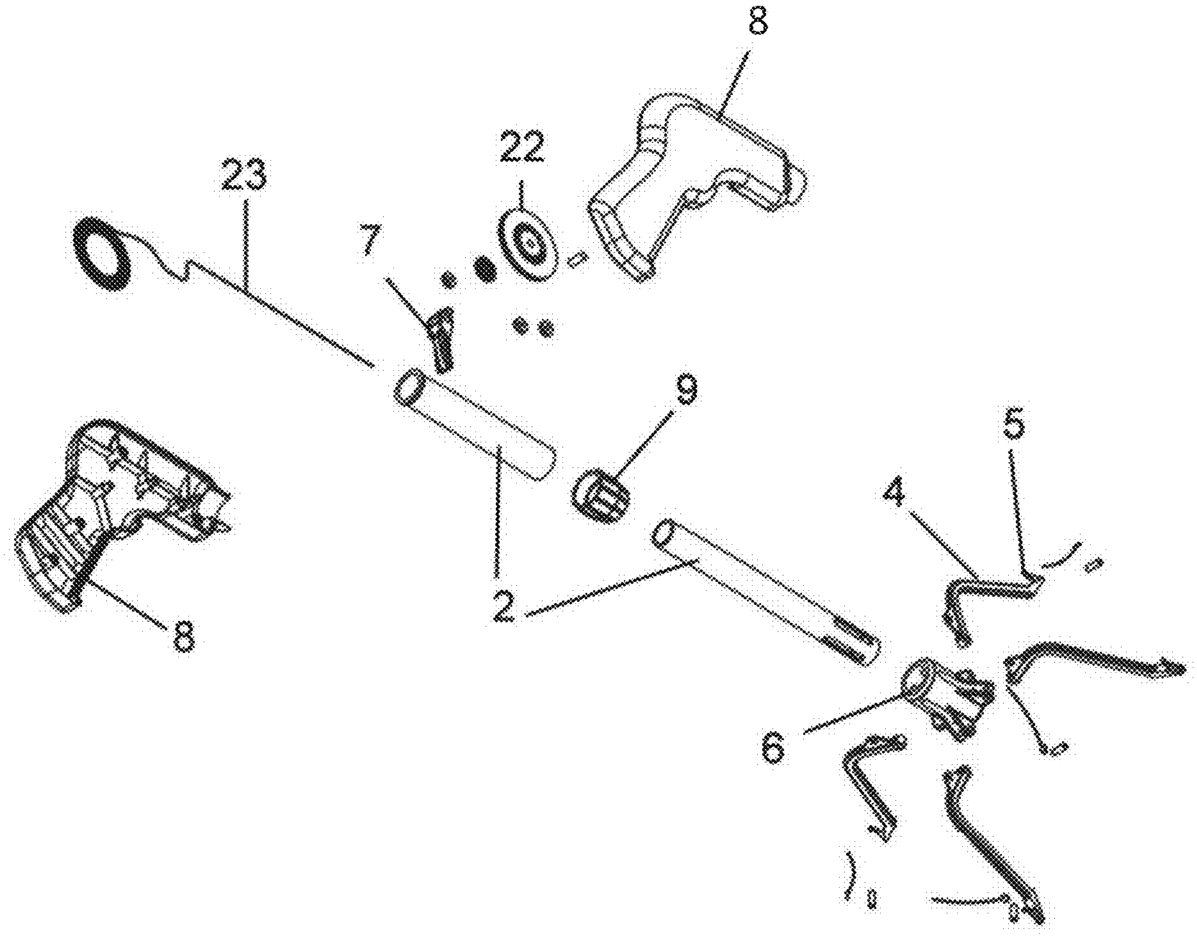
FIG. 8 shows a reverse exploded isometric view of the embodiment of the device shown in FIG. 1.
Figure 9A:
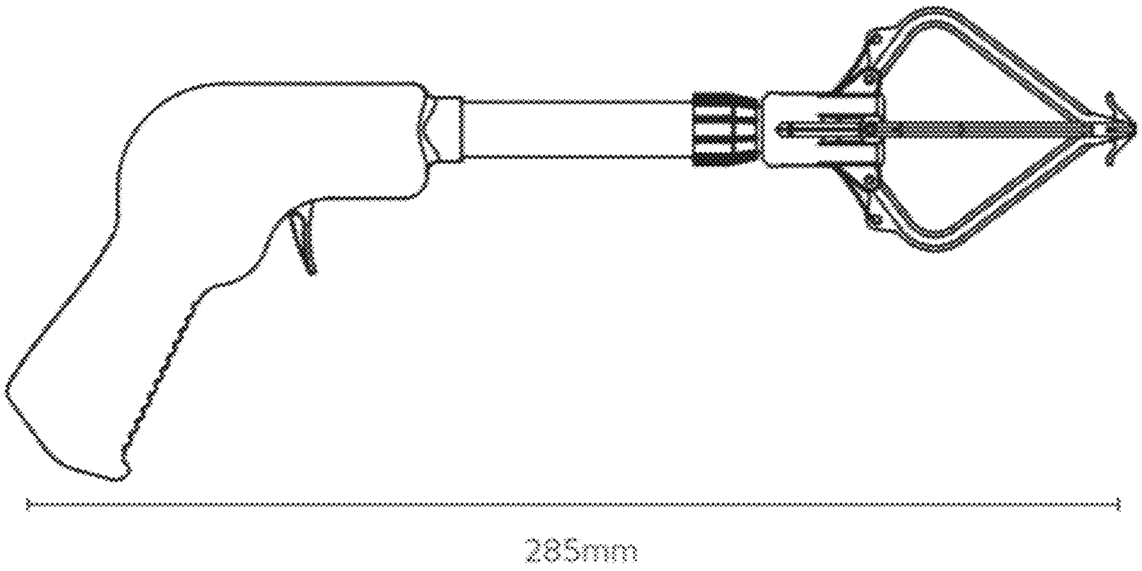
FIGS. 9A and 9B show a side view and an end view, respectively, of the embodiment of the device shown in FIG. 1, with the picker in the second position and the elongate member in the first position.
Figure 9B:
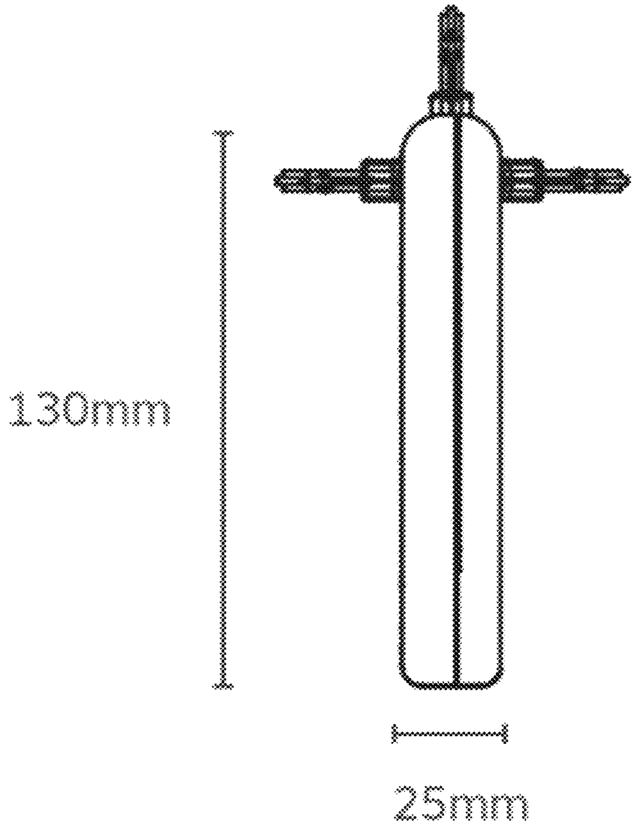

With reference to the Figures, there is shown an embodiment of a pet litter pickup device 199 generally comprising an elongate member 2 with a handgrip 8 at a first proximate end, and a picker 3 at the second distal end, the picker having three or more arms 4, the handgrip comprising a picking mechanism activated by the trigger 7 and the elongate member 2 is arranged to extend from a first retracted transport length to a second longer usage length, the picking mechanism arranged to control movement of arms 4 from a first open position to a second closed position, the arms defining an internal volume in the second position adapted for pet faeces, and the arms including catches 5 adapted to catch and hold a litter bag (not shown) within the internal volume in the first and second position.

With the reference to the embodiment of the device shown in the Figures, the embodiment comprises a moulded plastic handgrip for example formed in acrylonitrile butadiene styrene (ABS). In other examples, the handgrip may comprise another material such as metal, or other polymeric material.

The handgrip 8 is formed similar to a gun, with trigger 7 to a lower part and the elongate member 2 extends from such handgrip in front and above the trigger 7.

At the distal second end, the embodiment comprises the picker 3 which is formed of four splayed arms 4 in the first position, the arms having anchors for cords on an outer edge, which cords are connected to a plate traveling in a housing 6 at the second end of the member. For example, the first open position is a position in which the ends of the arms 4 are spread apart from one another, and the second closed position is a position in which the ends of the arms 4 are closer to one another. For example, an amount of pet faeces may be held within the internal volume of the arms in the second closed position.

In the examples of the Figures, the litter picker features catches 5 that comprise four hooks on the end of the arms to allow attachment of an elastic top bag to the picker.

Internally, the handgrip includes a pulley reel 22, which reel is controlled by the trigger 7 to reel in a ball chain 23, which chain passes through a member that is formed by two coaxially telescopic lengths of aluminium cylindrical tubes to a distal second end. In these examples, aluminium cylindrical tubes are described. However, examples are not limited to two tubes. In addition, examples are not limited to aluminium tubes. For example, the telescopic members may comprise two or more cylindrical tubes (or members of another shape) comprising other suitable materials (e.g., steel, plastic, other metal alloy, 3D printing material, and the like).

In some examples, the pulley reel 22 helps keep the ball chain in position and the trigger 7 pulls this chain down when compressed, opening the arms 4 to open the internal volume wherein the trigger 7 hooks on one of the balls on the ball chain 23 and pull the arms 4 open. For example, the ball chain connects to (either directly, or via other components such as the previously described plate and cords) the anchors on the outer edges of the arms 4. When the ball chain is pulled by the action of the trigger 7, the arms 4 are pulled by the anchors on their outer edges to open to the first open position. This is an example, and those skilled in the art will appreciate that other specific mechanisms may be implemented to cause the arms 4 to open when the ball chain is pulled. In these examples, the arms 4 may be biased towards the second closed position.

In other examples, the trigger 7 being compressed pulls the ball chain, causing the arms 4 to close the internal volume, wherein the trigger 7 hooks on one of the balls on the ball chain 23 to cause the arms 4 to close. In other words, the mechanism comprising the ball chain may be configured with the arms 4 to function in the opposite manner to that described above. For example, the arms 4 may comprise anchors on the inner edges of the arms 4 (in other words, the edges which face the internal volume defined by the arms 4). For example, the ball chain connects to (either directly, or via other components such as the previously described plate and cords) the anchors on the inner edges (not shown) of the arms 4. When the ball chain is pulled by the action of the trigger 7, the arms 4 are pulled by the anchors on their inner edges to close to the second closed position. This is an example, and those skilled in the art will appreciate that other specific mechanisms may be implemented to cause the arms 4 to close when the ball chain is pulled. In these examples, the arms 4 may be biased towards the first open position.

In some examples, the tubing (which may be aluminium tubing) has a twist friction locking collar 9 to allow for easy telescoping and retracting of the litter picker. For example, the twist friction locking collar 9 is used to secure a particular telescoped position of the telescopic members. In other examples, other member locking mechanisms may be used to secure a particular telescopic position.

Figure 11:
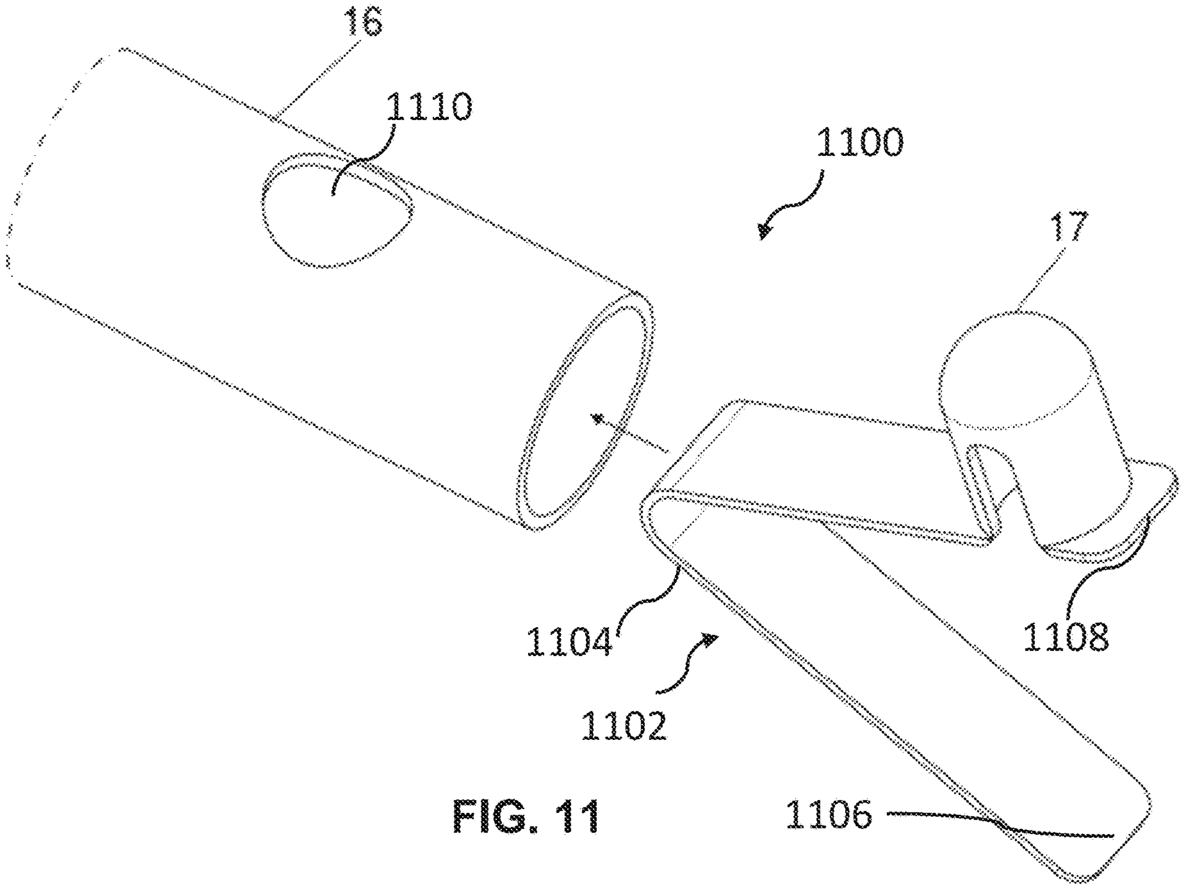
FIG. 11 is a schematic perspective view of an exemplary first member locking mechanism, according to examples.
Figure 12:
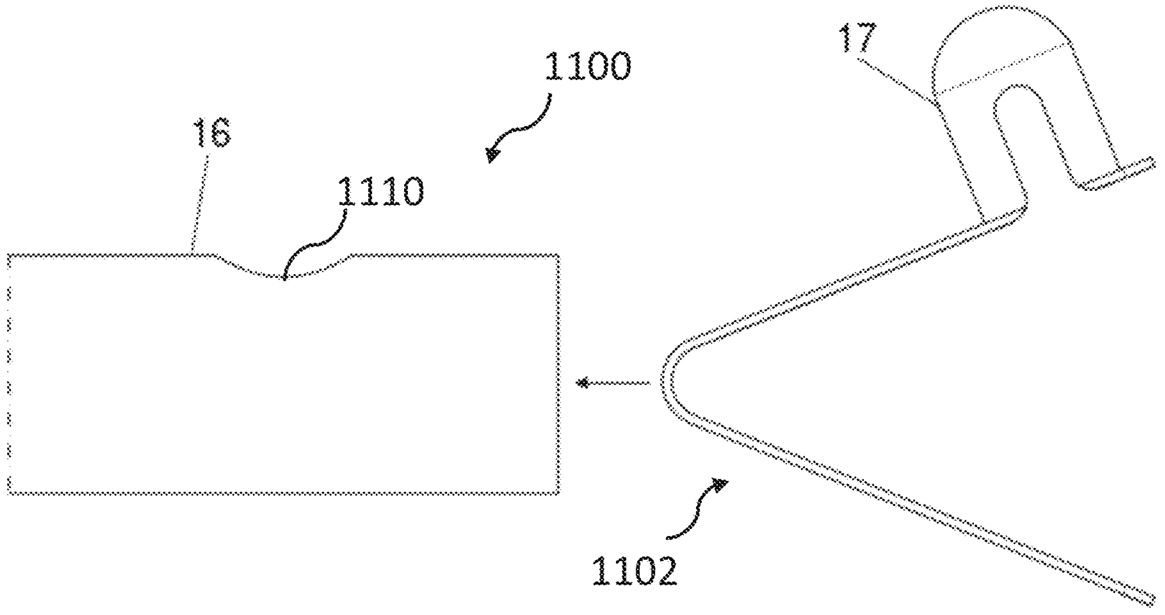
FIG. 12 is a schematic side view of the exemplary first member locking mechanism of FIG. 11, according to examples.

FIG. 11 is a schematic perspective view of an example first member locking mechanism 1100 for locking together telescopic members at a particular telescoped position. FIG. 12 is a schematic side view of the example first member locking mechanism 1100. For example, the first locking mechanism 1100 comprises a curved spring lock element 1102. The curved spring lock element 1102 comprises a spring-loaded pin 17 and a curved spring element 1104. The curved spring element 1104 comprises a fixing end, a pin end (towards which the spring-loaded pin 17 is provided) and a bend between these two ends. There is a spring force when these two ends are brought closer together, which spring force urges them apart. In these examples, the curved spring element 1104 may be fixed to a first one of the telescopic members (not shown) at the fixing end 1106 opposite to the pin end 1108. The first one if the telescopic members is hereafter referred to as the first telescopic member. For example, where the telescopic members are tubes, one tube inserting into the other, the fixing end 1106 may be fixed to the inner surface of the first telescopic member. In this case, the curved spring element 1104 extends across the inner diameter of the first telescopic member. For example, the first locking mechanism 1100 comprises an orifice 1110 provided on a second one 16 of the telescopic members (hereafter referred to as the second telescopic member 16). When the telescopic members are locked together using the locking mechanism 1100, the pin 17 is received into the orifice 1110. For example, the first telescopic member with the curved spring lock element 1102 may be inserted in the second telescopic member 16 comprising the orifice 1110. There may be provided one or more orifices located appropriately depending on the desired telescoped positions.

However, if the example first member locking mechanism 1100 of FIGS. 11 and 12 is placed between the handgrip 8 and the arms 4, the curved spring lock element 1102 may obstruct the ball chain which would pass from the handgrip 8 to the arms 4 within the tubular telescopic members. To address this, there may be provided a member locking mechanism to lock length extension, wherein the member locking mechanism is a spring-loaded pin mechanism configured on the telescopic members such that a centre region of the telescopic members is unoccupied by the member locking mechanism. Such an example second member locking mechanism described in the following may be deployed.

Figure 13:
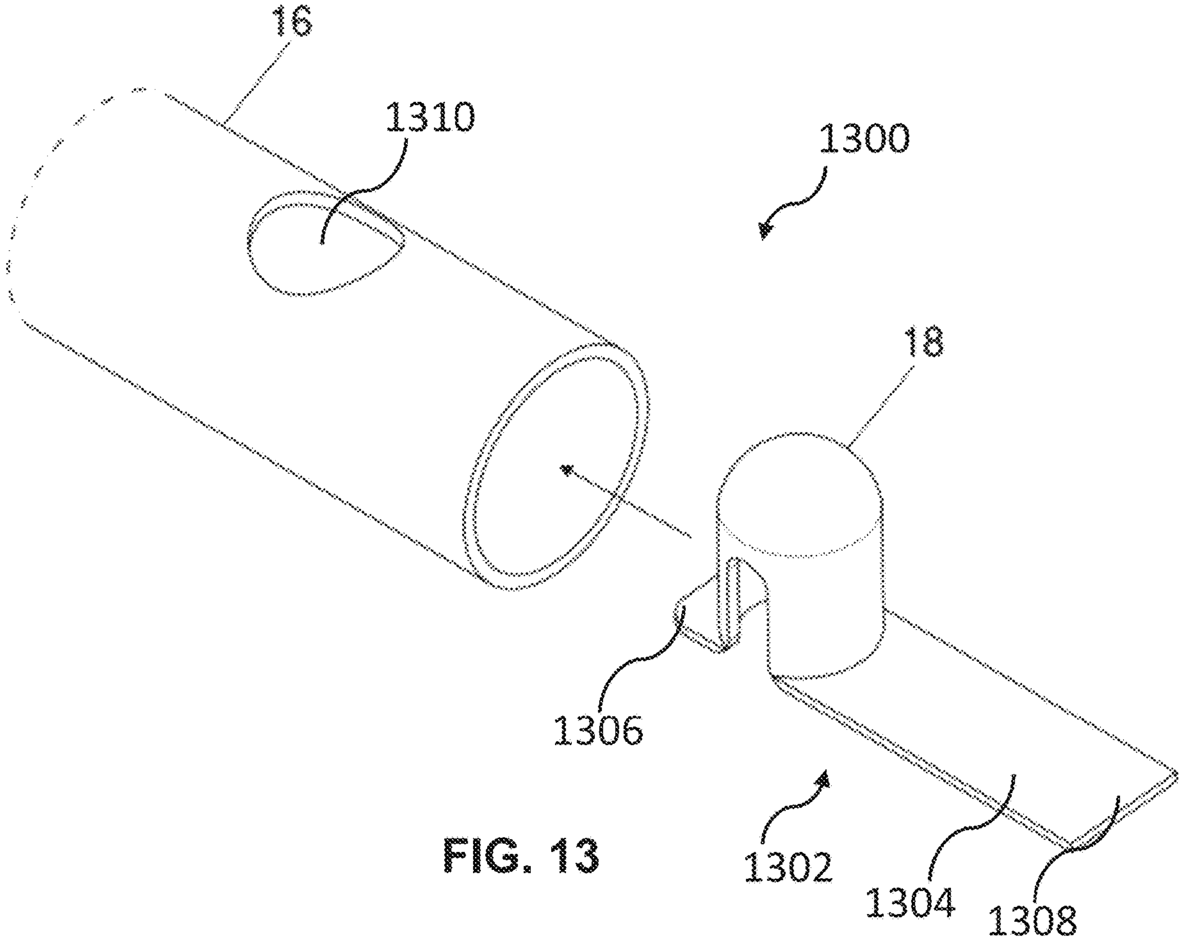
FIG. 13 is a first schematic perspective view of an exemplary second member locking mechanism, according to examples.
Figure 14:
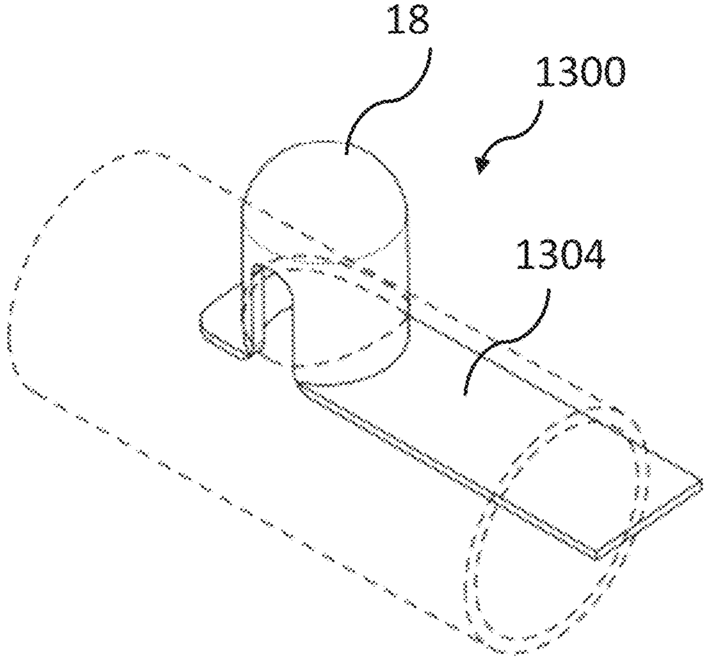
FIG. 14 is a second schematic perspective view of the exemplary second member locking mechanism of FIG. 13, according to examples.

FIG. 13 is a first schematic perspective view of the example second member locking mechanism 1300, according to examples, for locking together telescopic members at a particular telescoped position. FIG. 14 is a second schematic perspective view of the example second member locking mechanism 1300. The second member locking mechanism 1300 comprises a flat spring lock element 1302. The flat spring lock element 1302 comprises a flat spring plate 1304. There is a spring-loaded pin 18 provided towards a pin end 1306 of the flat spring plate 1304. The flat spring plate 1304 is fixed towards a fixing end 1308 to the first telescopic member (no shown). The fixing end 1308 is opposite to the pin end 1306. The flat spring plate 1304 is fixed to the first telescopic member such that a centre region within the telescopic members is unoccupied by the flat spring lock element 1302. In these examples, the flat spring plate 1304 can deflect. For example, when a force is applied at the pin 18, the flat spring plate 1304 may flex, supported by its connection to the first telescopic member.

In these examples, the second member locking mechanism 1300 also comprises an orifice 1310 configured to receive the spring-loaded pin 18. The orifice 1310 is provided on the second telescopic member 16. For example, the orifice 1310 is provided at a location (and the spring lock element 1302 fixed to the first telescopic member at a location) according to the telescopic position desired to be locked. For example, there may be provided two or more orifices on the second telescopic member 16 according to the desired telescopic positions.

Figure 15:
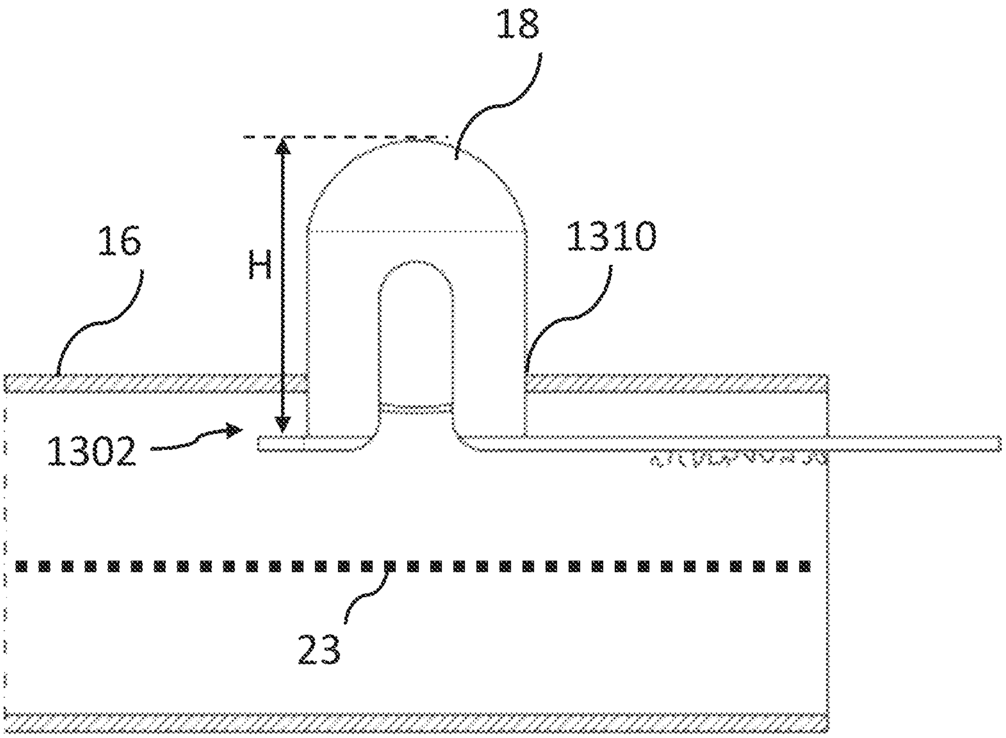
FIG. 15 is a schematic side cross-sectional view of the exemplary second member locking mechanism of FIG. 14, according to examples.

FIG. 15 is a schematic side cross-sectional view of the example second member locking mechanism 1300, according to examples. In these examples, the pin 18 is shown received in the orifice 1310 of the second telescopic member 16. For example, the height H of the pin 18 may be chosen such that the flat spring lock element 1302 does not interfere with the ball chain (represented as dotted line 1500) in the centre region of the telescopic members, even when the pin 18 is fully pushed down to disengage from the orifice 1310, for example. For example, the pin 18 may be pushed down, causing the flat spring plate 1304 to flex. For example, the flat spring plate 1304 is biased towards a flat configuration so that when the pushing force on the pin 18 is removed/reduced, the flat spring plate 1304 returns to the flat configuration. Advantageously, a convenient telescoping locking mechanism may be provided which functions together with the ball chain to provide a telescoping litter picker which can function to open/close the arms 4 at any telescoped position.

In some examples, the handgrip may screw together and may have bosses and bearings for keeping the pulleys in place and for ensuring low friction within the ball chain mechanism.

The internal recoil pulley 22 keeps the ball chain rolled up and under tension no matter the telescoped position.

The trigger 7 only engages with the chain when pulled on. This allows the chain to pass freely through it when telescoping the end out. For example, the trigger 7 comprises a structure which catches one of the balls on the ball chain when pulled, but does not catch any of the balls of the ball chain when not pulled.

The litter picker can be used in a retracted position and the picker remains compact, also when needed, the litter picker can be telescoped. The litter picker may be telescoped to one or more telescoped positions longer than the retracted position. In some examples, the picker is in naturally closed state (in other words, biased towards the second closed position), and pulling on the trigger opens the three or more (e.g., four) arms and releasing the trigger shuts them. In other examples, the picker is in naturally opened state (in other words, biased towards the first open position), and pulling on the trigger closes the arms 4 and releasing the trigger opens them. For examples, the arms 4 may be arranged with springs and the like to bias them as desired.

As an alternative solution an elastic cord may be used. This would attach to the trigger and be stretched to tension when the telescopic tube is extended to ensure the arms do not automatically open, torsion springs may be used to keep them closed.

In some examples, the telescopic tubular member is a sourced aluminium tube that extends to a certain length so in that way the embodiment provides a compact telescopic litter picker that can either be integrated into or attached to a retractable dog leash and handle 100 as shown in the Figures so as to allow for hands-free picking up of dog faeces.

The litter picker could be integrated into a retractable dog lead to create a single product or nay be connected to an existing dog lead handle in other embodiments. For example, the device may comprise a connection means for a dog lead. Those skilled in the art will appreciate the various mechanism for attaching one component to another, for example, friction fit, screws, bolts, clipping mechanisms, strap mechanisms and the like.

With reference to the embodiment shown in FIG. 1, there is shown a handle 100 having a plastic (although the handle 100 may comprise other materials) body 1 and 11 extendable dog lead for the embodiment of the device 99 shown in the Figures, so as to form the embodiment of the apparatus 199 according to the second aspect of the present invention.

Figure 10:
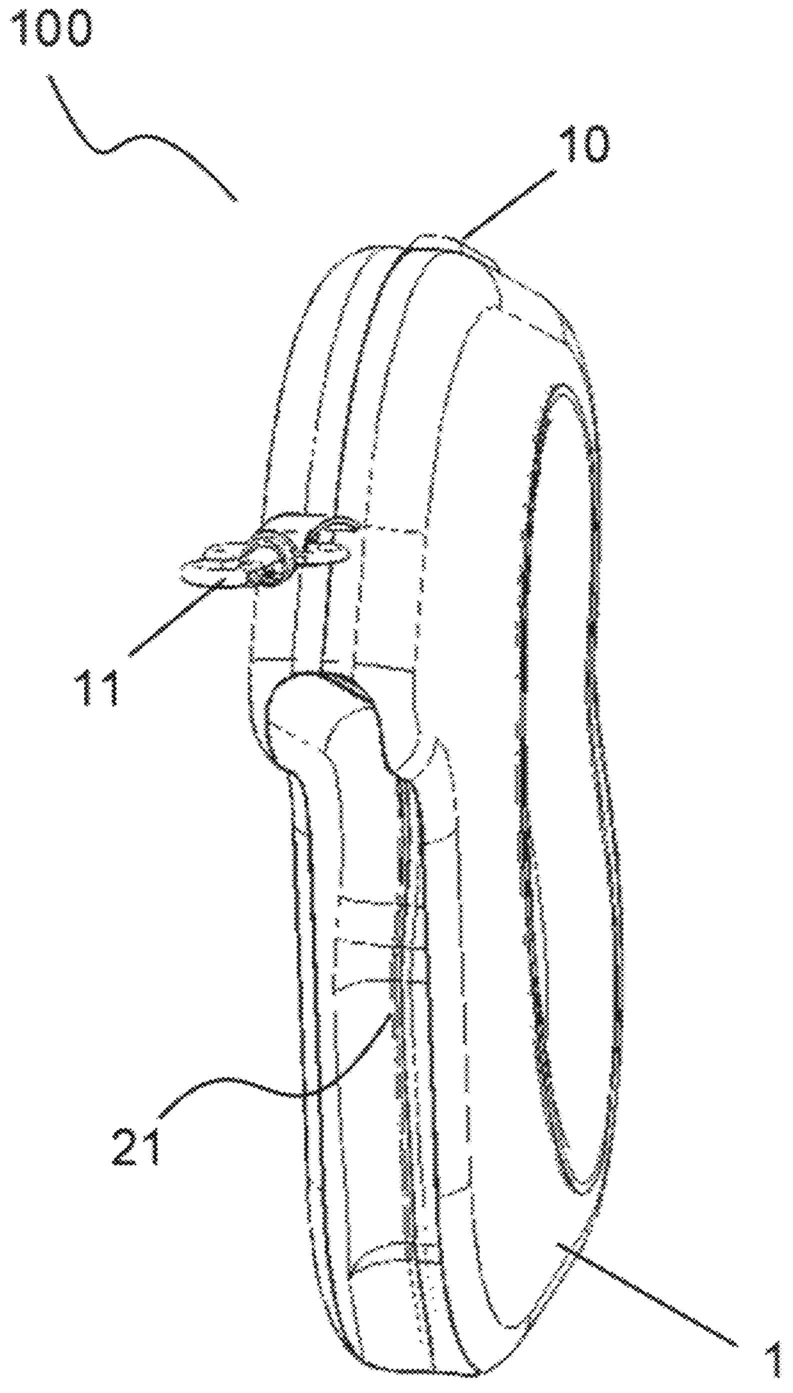
FIG. 10 shows an isometric view of the embodiment of the handle shown in the embodiment of the apparatus shown in FIG. 1.

Moulded finger grips aid in the handle and could be over-moulded in rubber for a more tactile grip. With the reference of FIG. 10, a dock 21 receives the device with a friction or tolerance fit.

The following is a further description of certain examples.

In some examples there is provided a pet litter pickup device comprising an elongate member with a handgrip at a first proximate end, and a picker at the second distal end, the picker having three or more arms, the handgrip comprising a picking mechanism, and the elongate member is arranged to extend from a first retracted transport length to a second longer usage length, the picking mechanism arranged to control movement of arms from a first open position to a second closed position, the arms defining an internal volume in the second position adapted for receiving a pet faeces, and the arms including catches adapted to catch and hold a plastic bag within the internal volume in the first and second positions.

The device may comprise four arms.

The catches may comprise reversed hooks.

The device may comprise catches located to the distal side of the arms from the internal volume.

The device may comprise a member locking collar to lock length extension.

The handgrip may comprise a trigger for the mechanism. The trigger may be configured to activate the picking mechanism.

The mechanism may comprise a ball chain.

The mechanism may comprise an elastic cord.

The mechanism may comprise a pulley.

The device may comprise a light source.

The device may comprise a bag holder.

In some examples, there is provided an apparatus may comprise a pet litter pickup device and a handle comprising a lead, the apparatus comprising a connection mechanism for the device to the handle.

A handle for the apparatus may comprise a retractable lead.

The handle may comprise a lanyard attachment point.

The connection mechanism may comprise a dock on the handle.

The telescopic members may be arranged to extend from a first retracted transport length to a second usage length or a third usage length. The second usage length and the third usage length are longer than the first retracted transport length. The second usage length and the third usage length are different lengths. In other words, the telescopic members may be arranged in a retracted position, a partially extended position, or a fully extended position.

The picking mechanism is configured to function when the telescopic members are in any position. In other words, the picking mechanism is designed to function when the telescopic members are in any one of the first retracted transport length, the second usage length, or the third usage length. For example, the picker mechanism is configured to function whether the telescopic members are retracted, partially extended, or fully extended. In this way, the device may be used whether the telescopic members are retracted, partially extended, or fully extended.

Each arm may comprise a catch located at an end of the arm distal to the telescopic members. In other words, a catch may be formed at the end of one or more arms.

The picking mechanism is configured to control movement of the arms from a first open position to a second closed position. In the first open position the arms define an opening for enclosing or receiving a pet faeces. In the first open position, the distal ends of the arms, namely the ends of the arms with the reversed hooks, are apart from each other. In the second closed position the arms are arranged to capture and hold the pet faeces. In the second closed position, the arms are positioned such that the reversed hooks are brought together. The arms define an internal volume.

A litter bag may rest against the catches at the end of the arms and be kept in position during use. The litter bag may include an elastic top, such that the elastic top rests against the catches. The catches may be adapted to catch and hold the elastic top of the litter bag. The litter bag may line the internal volume when the arms are in the first open position and in the second closed position. The catches may be configured to hold the litter bag within the internal volume when the arms are moved between the first open position and the second closed position.

The catches may comprise hooks configured to prevent the litter bag from disengaging from the arms of the device.

In some examples, there is provided a pet litter pickup device comprising a hand grip at a first proximate end, a picker at a second end and telescopic members, the picker having three or more arms. In these examples, the telescopic members are arranged to extend from a first retracted transport length to a second usage length and/or a third usage length longer than the second usage length. In these examples, the hand grip comprises a picking mechanism, wherein: the picking mechanism is arranged to control movement of the arms; the picking mechanism is activated by a trigger; and the picking mechanism is designed to function by being arranged to control movement of the arms from a first open position to a second closed position in any position of the telescopic members such as at the first retracted transport length, the second usage length and/or the third usage length. In these examples, the picking mechanism comprises a spring loaded pulley and a ball chain that is wrapped around the spring loaded pulley to keep the ball chain under tension no matter the telescoped position. In these examples, the trigger is configured to pull the ball chain when pulled on to open the arms to the first open position, wherein the trigger is configured to only engage with the ball chain when pulled on, and to allow the chain to pass freely through when the trigger is not pulled. In these examples, the arms define an internal volume in a closed position adapted for receiving a pet faeces, the arms include catches adapted to catch and hold a top elastic litter bag within the internal volume in the closed and open position.

In these examples, the device may comprise four arms. In these examples, the catches may comprise reversed hooks. In these examples, the device may comprise catches located to the distal side of the arms from the internal volume. In these examples the device may comprise a member locking collar or a member locking mechanism to lock length extension. In these examples, the device may comprise the member locking mechanism to lock length extension, wherein the member locking mechanism is a spring-loaded pin mechanism configured on the telescopic members such that a centre region of the telescopic members is unoccupied by the member locking mechanism. In these examples, the member locking mechanism may comprise: a flat spring lock element, the flat spring lock element comprising: a flat spring plate; and a spring-loaded pin provided towards a pin end of the flat spring plate, wherein: the flat spring plate is fixed towards a fixing end, opposite to the pin end, to a first one of the telescopic members such that a centre region within the telescopic members is unoccupied by the flat spring lock element; the member locking mechanism further comprises: an orifice, provided on a second one of the telescopic members, configured to receive the spring-loaded pin. In these examples, the hand grip may comprise a trigger for the mechanism. In these examples, the device may comprise a light source. In these examples, the device may comprise a bag holder. In these examples, the catches may be adapted to catch and hold an elastic top of the litter bag, which elastic top rests against the catches.

In some examples, there may be provided an apparatus comprising the described pet litter pickup device according to any example, and a handle comprising a lead, the apparatus comprising a connection mechanism for the device to the handle. In these examples, the handle may comprise a retractable lead. In these examples, the handle may comprise a lanyard attachment point. In these examples, the connection mechanism may comprise a dock on the handle.

EXAMPLES

The following illustrate further examples of the disclosure:

Example 1

A pet litter pickup device comprising a hand grip at a first proximate end, telescopic members and a picker at a second end, the picker having three or more arms, the hand grip comprising a picking mechanism and the telescopic members are arranged to extend from a first retracted transport length to a second usage length and/or a third usage length longer than the second usage length, the picking mechanism is arranged to control movement of the arms, the picking mechanism is activated by a trigger and the picking mechanism is designed to function in any position of the telescopic members such as at the first retracted transport length, the second usage length and/or the third usage length, the arms define an internal volume in a closed position adapted for receiving a pet faeces and the arms including catches adapted to catch and hold a top elastic litter bag within the internal volume in the closed and open position.

Example 2

A device according to clause 1 comprising four arms.

Example 3

A device according to clause 1 or 2 wherein the catches comprise reversed hooks.

Example 4

A device according to any preceding clause comprising catches located to the distal side of the arms from the internal volume.

Example 5

A device according to any preceding clause comprising a member locking collar or a member locking mechanism to lock length extension.

Example 6

A device according to any preceding clause wherein the hand grip comprises a trigger for the mechanism.

Example 7

A device according to any preceding clause wherein the mechanism comprises a ball chain.

Example 8

A device according to any preceding clause wherein the mechanism comprises a pulley.

Example 9

A device according to any preceding clause comprising a light source.

Example 10

A device according to any preceding clause comprising a bag holder.

Example 11

Apparatus comprising a pet litter pickup device and a handle comprising a lead, the apparatus comprising a connection mechanism for the device to the handle.

Example 12

A handle for apparatus according to clause 11 comprising a retractable lead.

Example 13

A handle according to clause 11 and 12 comprising a lanyard attachment point.

Example 14

Handle according to clause 12 or clause 13, wherein the connection mechanism comprises a dock on the handle.

Example 15

According to any preceding clause the device will use a litter bag with and elastic top that will rest against the catches at the end of the arms and will be kept in position whenever used.

Example 16

A device according to any preceding clause wherein the mechanism comprises an elastic cord.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention.

What is claimed is:

1. A pet litter pickup device comprising:
- a first proximate end and a hand grip at the first proximate end;
- a second distal end and a picker at the second distal end, the picker having three or more arms; and
- telescopic members, the telescopic members being arranged to extend from a first retracted transport length to a second usage length and/or a third usage length longer than the second usage length,
- the hand grip comprising a picking mechanism, wherein:
  - the picking mechanism is arranged to control movement of the three or more arms;
  - the picking mechanism is activated by a trigger; and
  - the picking mechanism is designed to function by being arranged to control movement of the three or more arms from a first open position to a second closed position in any of the first retracted transport length, the second usage length, and/or the third usage length of the telescopic members, wherein:
    - the picking mechanism comprises a spring loaded pulley and a ball chain that is wrapped around the spring loaded pulley to keep the ball chain under tension no matter the telescoped position; and
    - the trigger is configured to pull the ball chain when pulled on to open the three or more arms to the first open position, the trigger being configured to only engage with the ball chain when pulled on, and to allow the chain to pass freely through when the trigger is not pulled,
- the three or more arms defining an internal volume in the second closed position configured to receiving a pet faeces, and the three or more arms including catches configured to catch and hold a top elastic litter bag within the internal volume in the second closed position and the first open position.

2. The pet litter pickup device of claim 1, wherein the three or more arms comprises four arms.

3. The pet litter pickup device of claim 1, wherein the catches comprise reversed hooks.

4. The pet litter pickup device of claim 1, wherein the catches are located toward a distal side of the three or more arms from the internal volume.

5. The pet litter pickup device of claim 1, wherein the pet litter pickup device further comprises a member locking collar or a member locking mechanism configured to lock a length extension of the telescopic members at the first retracted transport length, the second usage length, and/or the third usage length.

6. The pet litter pickup device of claim 5, wherein the member locking collar or the member locking mechanism comprises the member locking mechanism configured to lock the length extension of the telescopic members, the member locking mechanism being a spring-loaded pin mechanism configured on the telescopic members such that a centre region of the telescopic members is unoccupied by the member locking mechanism.

7. The pet litter pickup device of claim 6, wherein the member locking mechanism comprises:
- a flat spring lock element, the flat spring lock element comprising:
  - a flat spring plate; and
  - a spring-loaded pin provided towards a pin end of the flat spring plate, wherein:

the flat spring plate is fixed towards a fixing end, opposite to the pin end, to a first one of the telescopic members such that a centre region within the telescopic members is unoccupied by the flat spring lock element; and the member locking mechanism further comprises:

an orifice, the orifice being provided on a second one of the telescopic members, the orifice being configured to receive the spring-loaded pin.

8. The pet litter pickup device of claim 1, wherein the hand grip comprises the trigger for the picking mechanism.

9. The pet litter pickup device of claim 1, further comprising a light source.

10. The pet litter pickup device of claim 1, further comprising a bag holder.

11. The pet litter pickup device according to claim 1, wherein the catches are configured to catch and hold the elastic top of the top elastic litter bag when the elastic top rests against the catches.

12. An apparatus comprising the pet litter pickup device of claim 1, the apparatus further comprising a handle comprising a lead, the apparatus further comprising a connection mechanism to connect the pet litter pickup device to the handle.

13. The apparatus of claim 12, wherein the handle comprises a retractable lead.

14. The apparatus of claim 12, wherein the handle comprises a lanyard attachment point.

15. The apparatus of claim 12, wherein the connection mechanism comprises a dock on the handle.

* * * * *